US012669106B2

(12) United States Patent
Newgent

(10) Patent No.: US 12,669,106 B2
(45) Date of Patent: Jun. 30, 2026

(54) WAVE HAMMER GENERATOR

(71) Applicant: Michael Newgent, Kapaa, HI (US)

(72) Inventor: Michael Newgent, Kapaa, HI (US)

( * ) Notice: Subject to any disclaimer, the term of this patent is extended or adjusted under 35 U.S.C. 154(b) by 0 days.

(21) Appl. No.: 19/043,492

(22) Filed: Feb. 2, 2025

(65) Prior Publication Data

US 2025/0250957 A1 Aug. 7, 2025

Related U.S. Application Data

(60) Provisional application No. 63/549,083, filed on Feb. 2, 2024.

(51) Int. Cl.
*F03B 13/18* (2006.01)

(52) U.S. Cl.
CPC ................................ *F03B 13/1845* (2013.01)

(58) Field of Classification Search
CPC .......... F03B 13/1845; F05B 2260/4031; F05B 2260/40312; F05B 2260/421; Y02E 10/30
See application file for complete search history.

(56) References Cited

U.S. PATENT DOCUMENTS

| | | | | | |
|---|---|---|---|---|---|
| 4,379,235 | A * | 4/1983 | Trepl, II | F03B 13/1815 | 60/498 |
| 4,389,843 | A * | 6/1983 | Lamberti | F03B 13/1815 | 60/507 |
| 4,469,955 | A * | 9/1984 | Trepl, II | F03B 13/1815 | 60/498 |
| 4,541,242 | A * | 9/1985 | Thompson, Jr. | F03B 13/1815 | 60/507 |
| 6,925,800 | B2 * | 8/2005 | Hansen | F03B 13/1815 | 60/497 |
| 7,315,092 | B2 * | 1/2008 | Cook | F03B 13/20 | 60/507 |
| 8,008,792 | B2 * | 8/2011 | Gray | F03B 13/20 | 290/53 |
| 9,347,332 | B2 * | 5/2016 | Hiejima | F03B 17/061 | |
| 9,587,620 | B2 * | 3/2017 | Rhinefrank | F03B 13/20 | |
| 9,863,395 | B2 * | 1/2018 | Rohrer | F03B 13/182 | |
| 10,167,601 | B2 * | 1/2019 | Mormino, Sr. | F03B 13/262 | |
| 10,352,289 | B1 * | 7/2019 | He | F03B 13/181 | |
| 11,661,916 | B1 * | 5/2023 | Padula | F03B 13/20 | 60/499 |
| 12,196,172 | B2 * | 1/2025 | Suddaby | F03B 13/14 | |
| 2006/0028026 | A1 * | 2/2006 | Yim | F03B 13/1815 | 290/53 |
| 2013/0200626 | A1 * | 8/2013 | Sidenmark | F03B 13/1885 | 60/504 |
| 2016/0032887 | A1 * | 2/2016 | Patton | F03B 13/1865 | 60/504 |

* cited by examiner

*Primary Examiner* — Jesse S Bogue
(74) *Attorney, Agent, or Firm* — L/O OF ALEXIS J SAENZ

(57) ABSTRACT

A wave hammer generator converts wave energy into mechanical energy. The wave hammer generator is positioned adjacent a water source with wave energy. As waves pass under a float, a vertical arm is moved by the wave energy. The energy transferred into the vertical arm may be transferred to other mechanisms that drive a weight ("the hammer") upward. The kinetic energy of the weight falling back toward gravity is then captured and transferred to an output.

12 Claims, 20 Drawing Sheets

SECTION M

DETAIL B

SECTION K

SECTION K

WAVE HAMMER GENERATOR

CROSS-REFERENCE TO RELATED APPLICATIONS

This application claims benefit under 35 U.S.C. § 119 (e) of U.S. Provisional Application having Ser. No. 63/549,083 filed Feb. 2, 2024, which is hereby incorporated by reference herein in its entirety.

FIELD

The subject disclosure relates to power generators, and more particularly, to a wave hammer generator.

BACKGROUND

In the field of ocean wave energy generation there lay common challenges. Given the nature of the ocean environment, it can be both difficult and expensive to install and maintain offshore energy systems pulling energy from the water environment. Generating sufficient power to justify this expense can be a substantial obstacle.

SUMMARY

In one aspect of the disclosure, a wave hammer generator apparatus is disclosed. The apparatus includes a float configured to sit atop or be submerged under, a surface of a body of water. The float moves up and down with a wave action. An arm is coupled to the float. The arm is configured to move as the float moves. A weight is coupled to the arm. The weight moves up and down in response to the arm moving. An output device is coupled to the weight. The movement of the weight up and down generates kinetic energy that is transferred to the output device.

In another embodiment, a wave hammer generator apparatus is disclosed. The apparatus includes a plurality of floats configured to sit atop or be submerged under, a surface of a body of water. The floats move up and down with a wave action. A plurality of arms are coupled to the respective floats. The arms are configured to move independent of each other as the respective floats move. A shaft is coupled to the plurality of arms. The shaft rotates in response to one or more of the arms moving via the movement of the floats. A weight is coupled to the shaft. The weight moves up and down in response to the shaft rotating. An output device is coupled to the shaft. The movement of the weight up and down generates kinetic energy that is transferred through the shaft to the output device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

Figure 1:
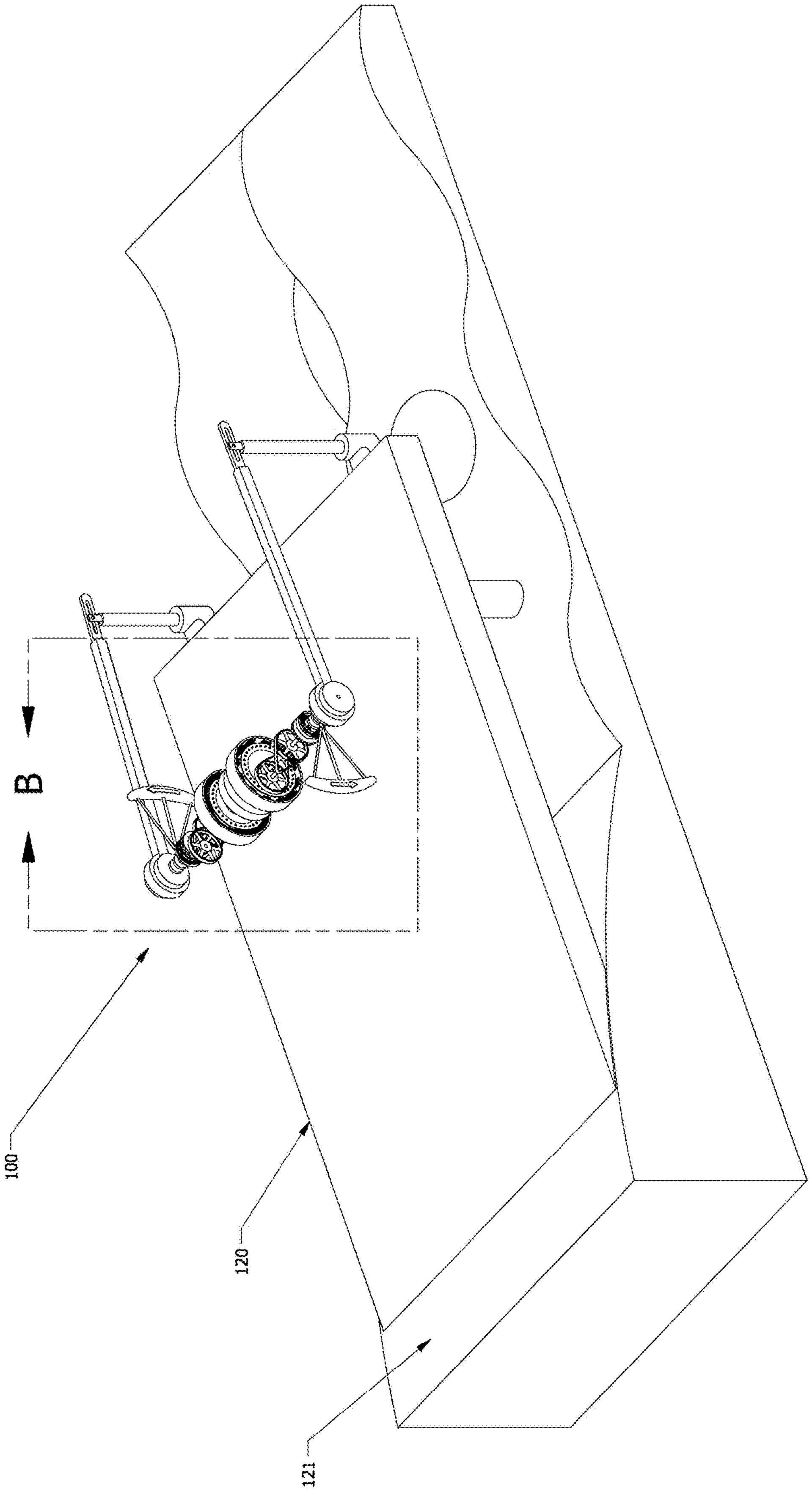
FIG. 1 is a perspective view of a wave hammer generator positioned proximate a body of water, in accordance with embodiments of the subject apparatus.

Referring now to FIGS. 1-15, a Wave Hammer Generator (WHG) 100 (sometimes referred to as the "apparatus 100"), is shown which addresses the challenges described above. The WHG 100 may be installed on land 121 as shown in FIG. 1, proximate a body of water 120 (See FIG. 1) or directly over water, lowering the installation and maintenance costs (mounting brackets are not depicted for sake of illustration). As will be appreciated, the WHG 100 can generate a high amount rotational energy in terms of torque from a relatively low movement of water such as a low wave sea state 114 (FIG. 2) by using the water movement to rotate a hammer weight 109. The kinetic energy from the rise and fall of the hammer weight 109 may be captured as power transferred to an output (not shown) connected to shaft 106 that couples the weight 109 to various power transfer elements.

Figure 2:
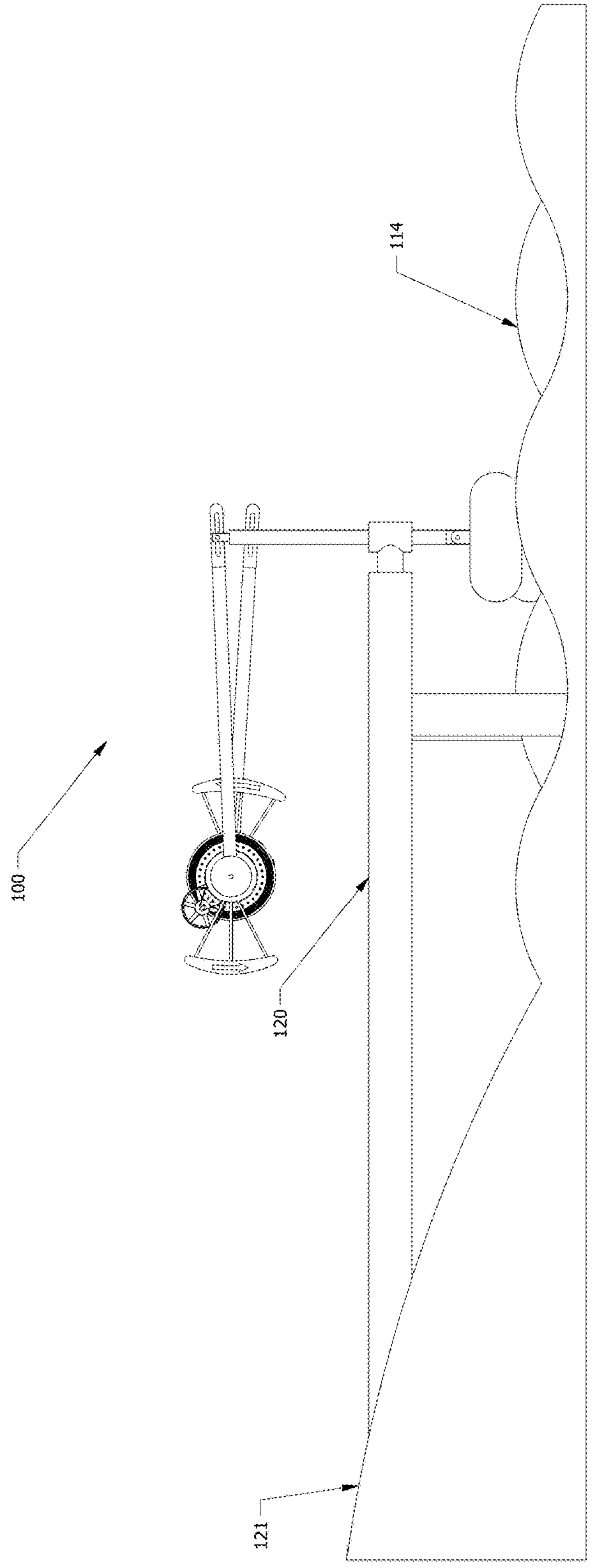
FIG. 2 is a side view of the generator of FIG. 1.
Figure 3:
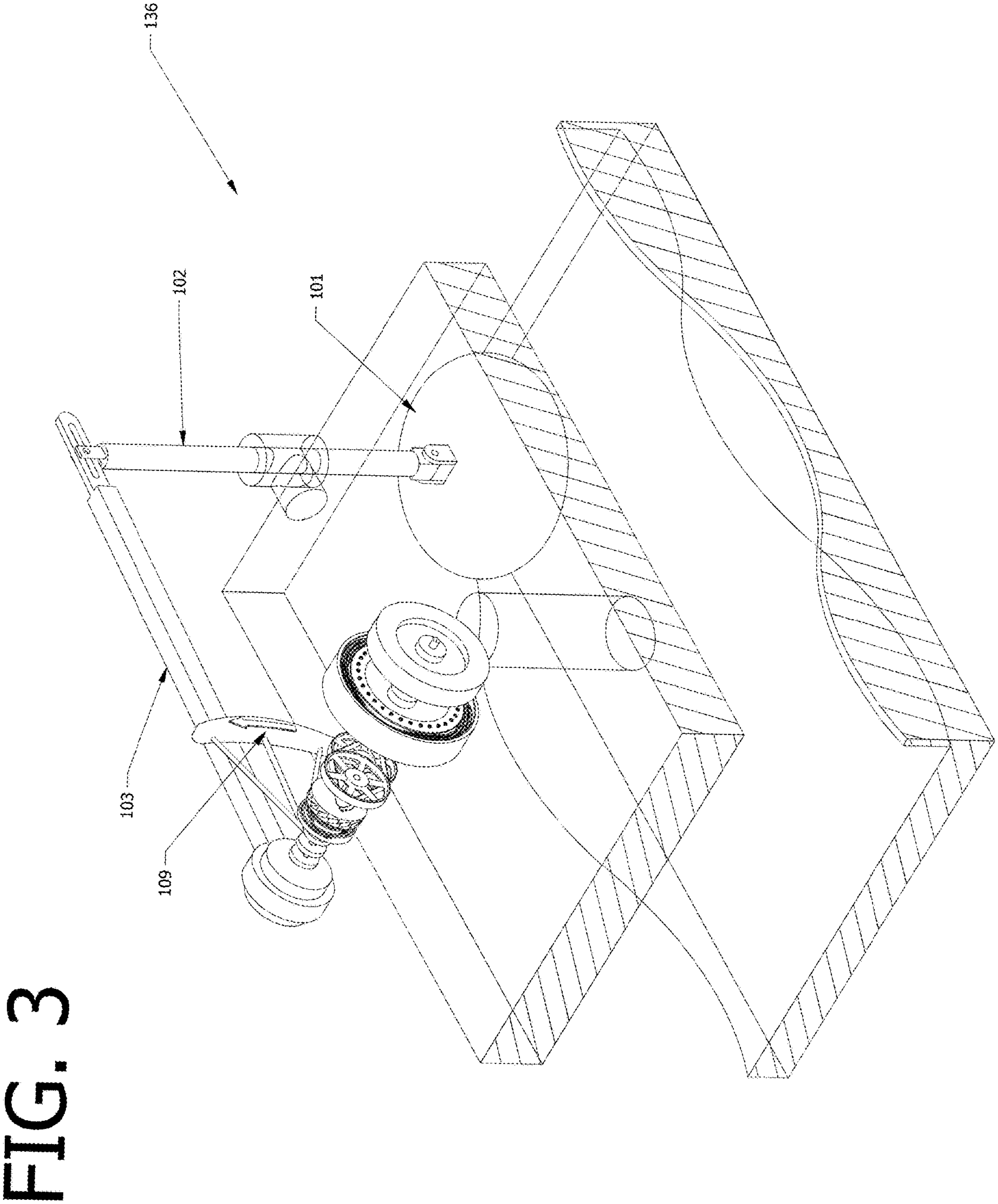
FIG. 3 is a perspective rear view of the generator of FIG. 1.

FIGS. 1-3 shown an embodiment of the apparatus using a single float 101 that is placed on or in the water. However, it should be appreciated that the energy from multiple waves can be captured by using embodiments that include multiple floats 101 attached to a shared shaft and weight 109 (or system of shafts and multiple weights 109 that are on the same apparatus). FIGS. 16-21 show an embodiment using multiple floats 101. Accordingly, in general, embodiments of the apparatus 100 may include one or more (a plurality of) floats 101 configured to sit atop or be submerged under, a surface of a body of water. The floats 101 move up and down with a wave action present in the body of water. Arms may be coupled to the respective floats 101. The arms may be configured to move independent of each other as the respective floats 101 move up and down from the wave state 114. At least one shaft may be coupled to the plurality of arms. The shaft rotates in response to one or more of the arms moving via a translation of the movement of the floats 101 being imparted to the shaft. As shown in the embodiments, the apparatus 100 may include a system of shafts (106, 107, 108, and 126) because of a gear reduction system 115 that may interrupt the linearity of the shaft axis. So, reference to the "shaft" may mean one or more shafts or shaft sections that are located along the central axis of rotation. A weight 109 is coupled to the shaft and the weight moves up and down in response to the shaft rotating. An output device may be coupled to the shaft. An "output device" in the context of the subject disclosure may be a mechanical connection or an electrical connection connected to either end of the shaft system or to a location on the shaft between elements. Electrical connections may be connected to electrical elements (which examples are disclosed as electrical generators 112, with other similar electrical devices being contemplated). The movement of the weight 109 up and down (for example, via rotation with the shaft system), generates kinetic energy that is transferred through the shaft to the output device.

Figure 9:
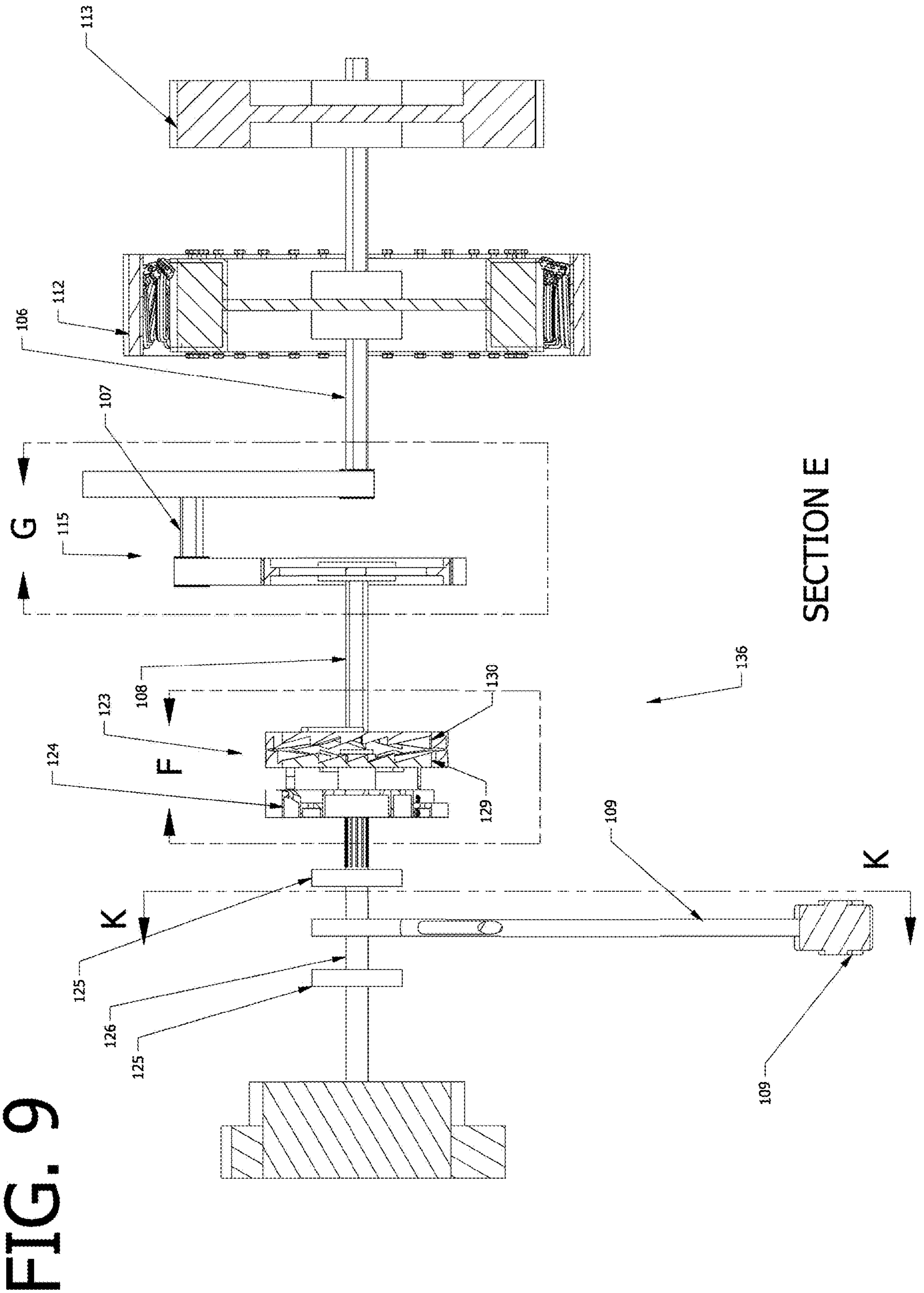
FIG. 9 is an enlarged cross-sectional view along the line E-E of FIG. 8.

The term "hammer" is a colloquial reference to the weight 109 (FIG. 3) attached to shaft 126 (FIG. 9). The WHG 100 can transfer wave energy in a way that incrementally lifts the weight 109 in response to a rotation of shaft 106, to a higher energy state until the weight 109 reaches its highest point 140 of energy potential (FIGS. 14, 15) relative to gravity. This energy is harnessed in the downward stroke 148. A gear reduction system 115 may convert the torque from shaft 108 into a higher RPM realized at shaft 106 (FIG. 9). This rotational energy can be further transferred to shaft 106 (FIG. 9). One or more electrical generator(s) 112 (FIG. 9) may be attached to the shaft 106 which may generate electrical power from the movement harnessed by the rise and fall of weight 109. Some embodiments may include a flywheel 113 (FIG. 9) which may also be attached to shaft 106, configured to preserve or conserve rotational energy between rotational inputs to shaft 106.

Figure 8:
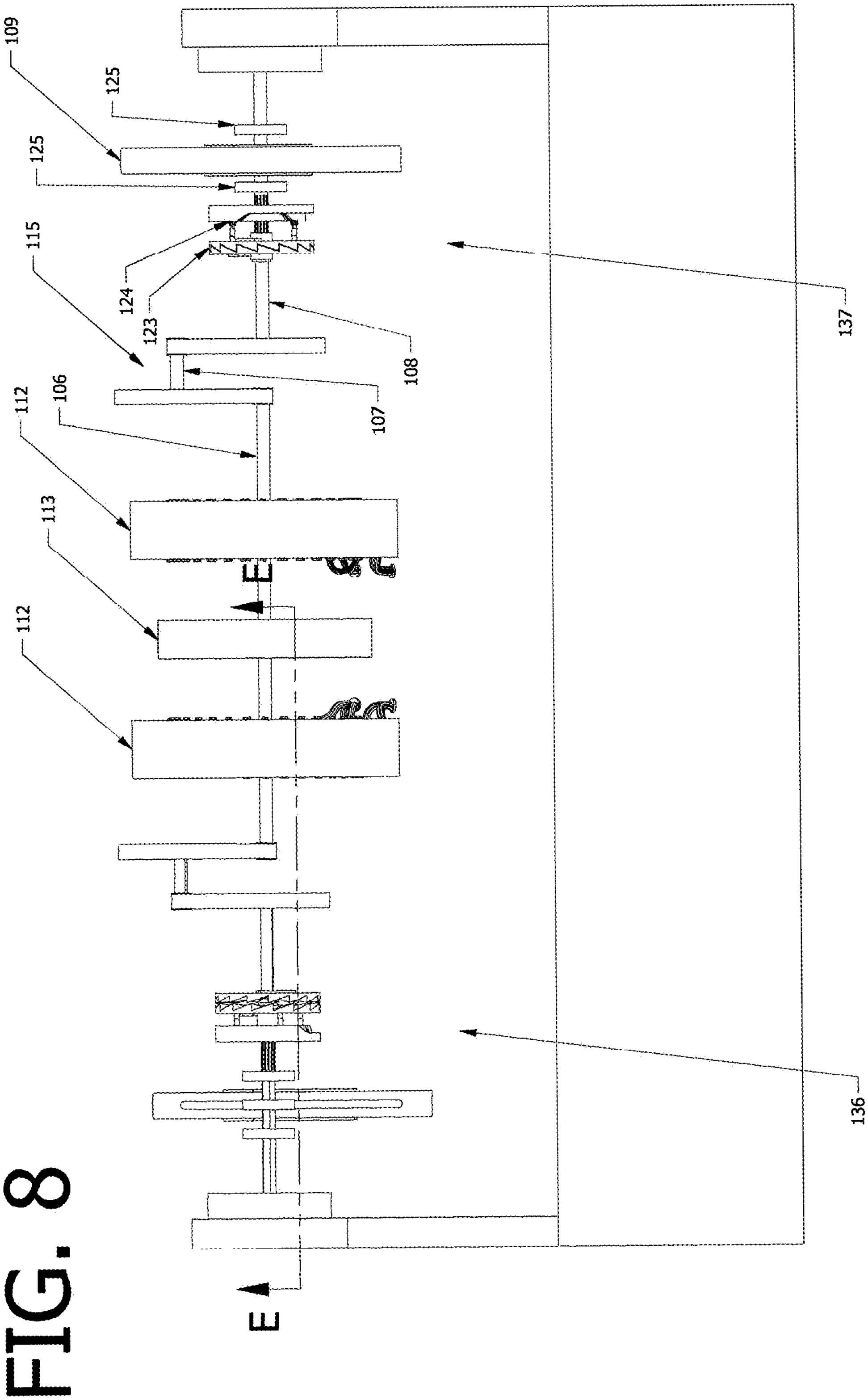
FIG. 8 is an enlarged front view of the generator of FIG. 1.

Shaft 126 may connect to one or more one-way bearings 125 (FIG. 8). The drawings show two one-way bearings on shaft 126 to either side of the weight 109. The one-way bearings 125 may be configured to rotate in one direction. For example, all one way-bearings 125 may rotate either clockwise or counter-clockwise in unison. The action of one-way bearing(s) 125 may preserve the position of weight 109 during the lifting or rising phase 149 (FIG. 14) by stopping the shaft 126 from turning in reverse or slipping backward as the float 101 move back down with the fall of a wave. In some embodiments, the weight 109 may be connected to an arm that is coupled to the shaft 126. At the base of the arm, there may be a one-way bearing 125 that couples the arm to the shaft 126. Any of the one-way bearings 125 may be configured engage the shaft 126 as gravity pulls the weight 109 down, causing rotation in the shaft 126 that is transferred to any other shaft elements (for example, shaft 106, shaft 108, etc.).

Figure 5:
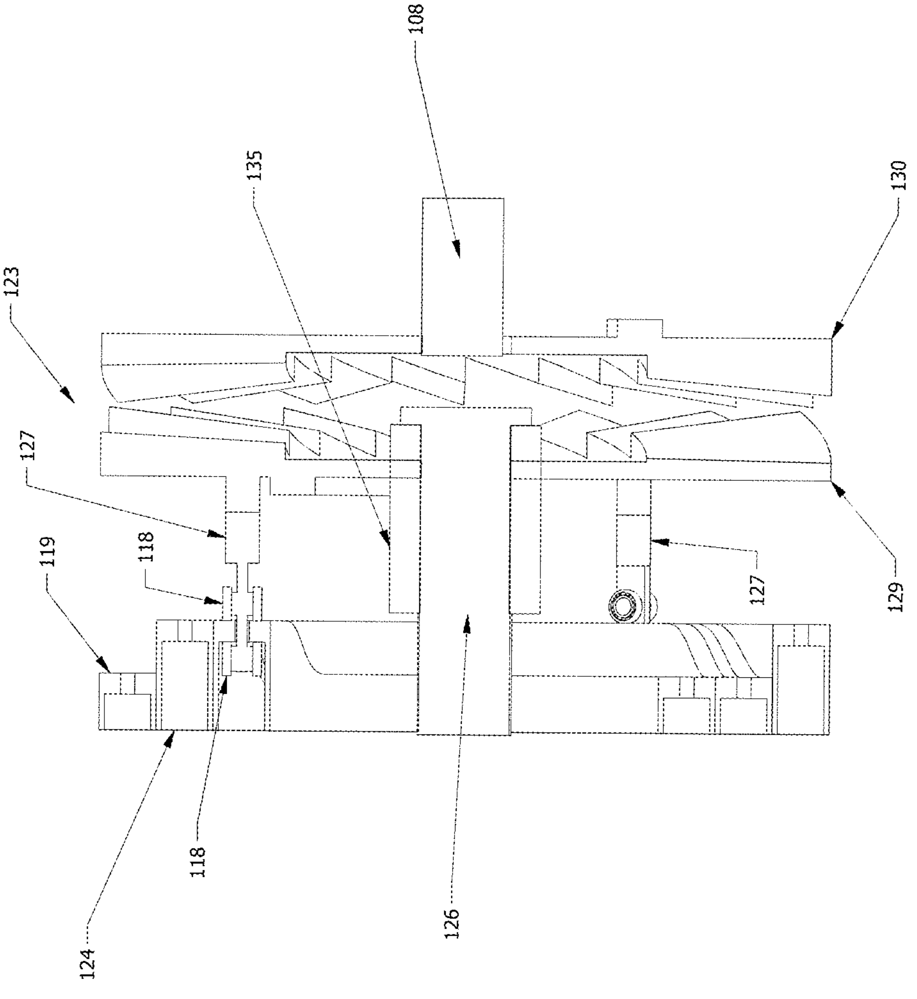
FIG. 5 is an enlarged cross-section view along the line M-M of FIG. 4.
Figure 6:
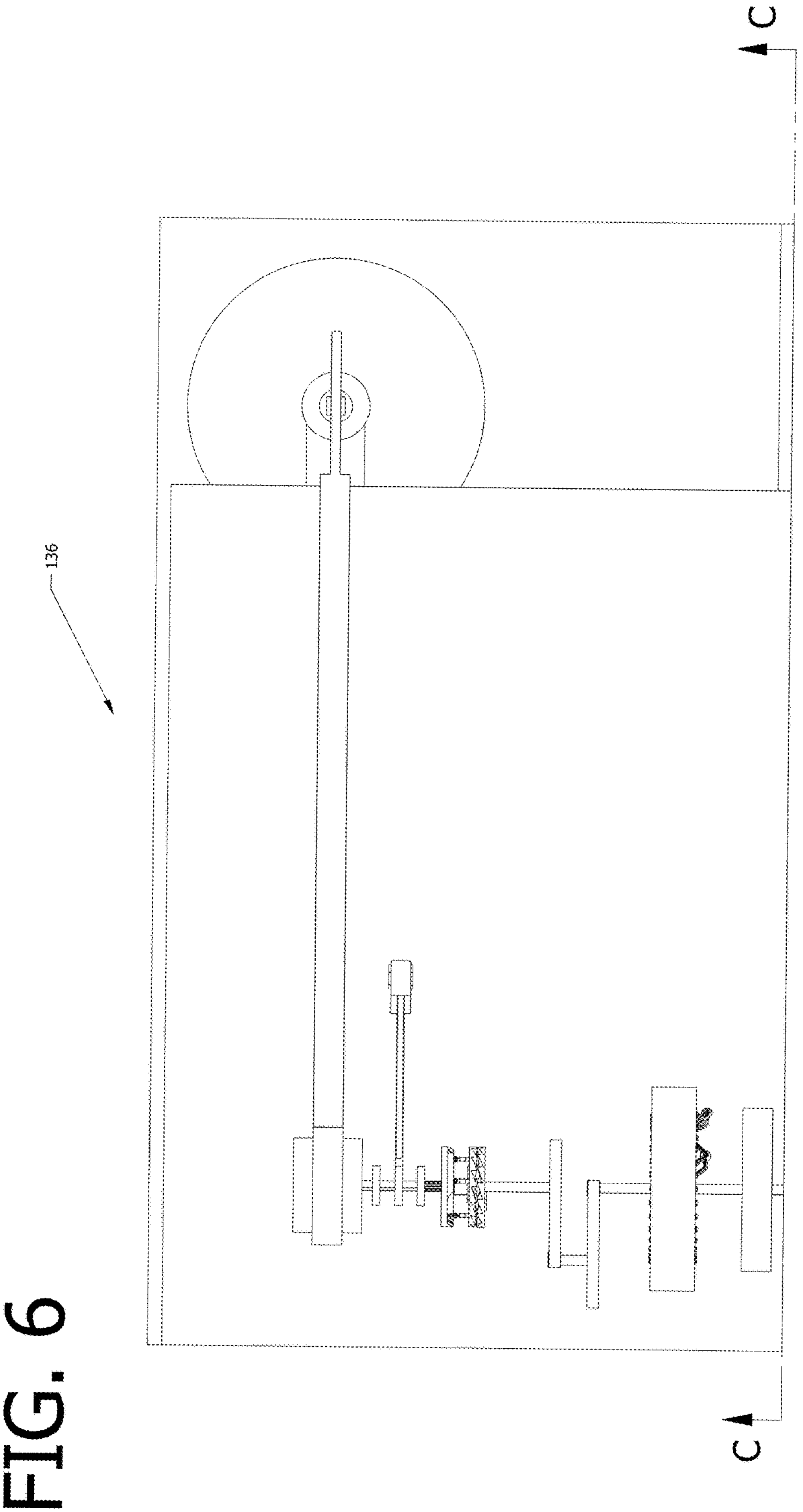
FIG. 6 is a top view of the generator of FIG. 1.
Figure 7:
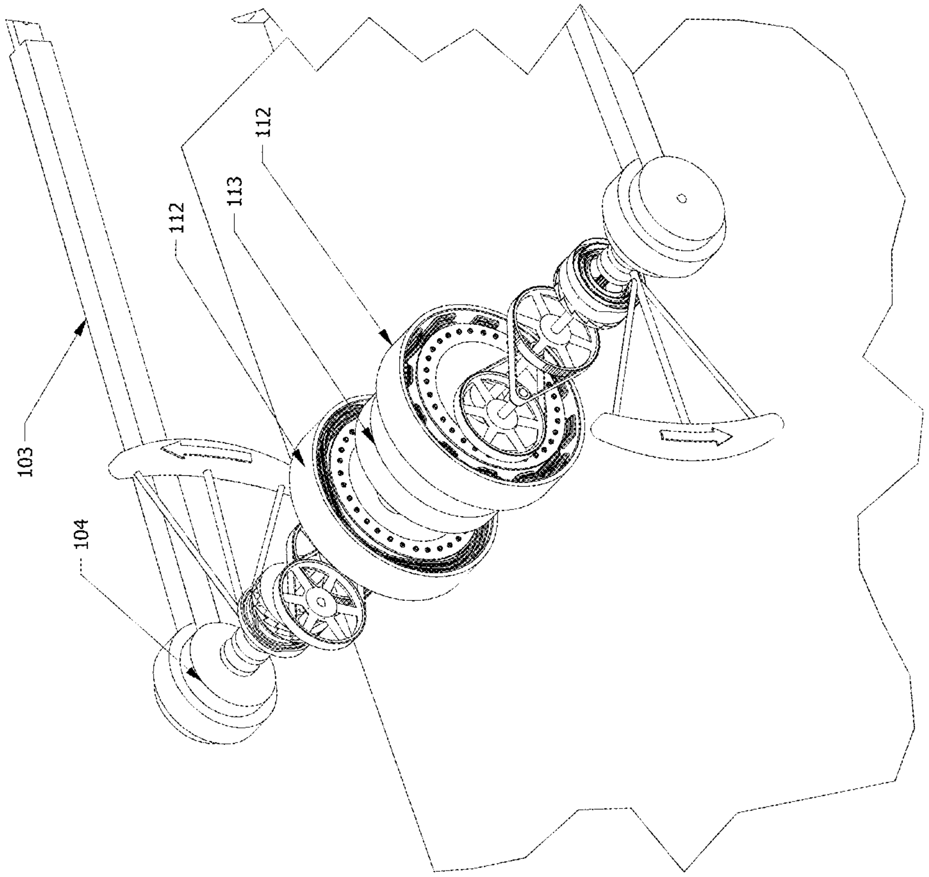
FIG. 7 is an enlarged view of Box B of FIG. 1.
Figure 10:
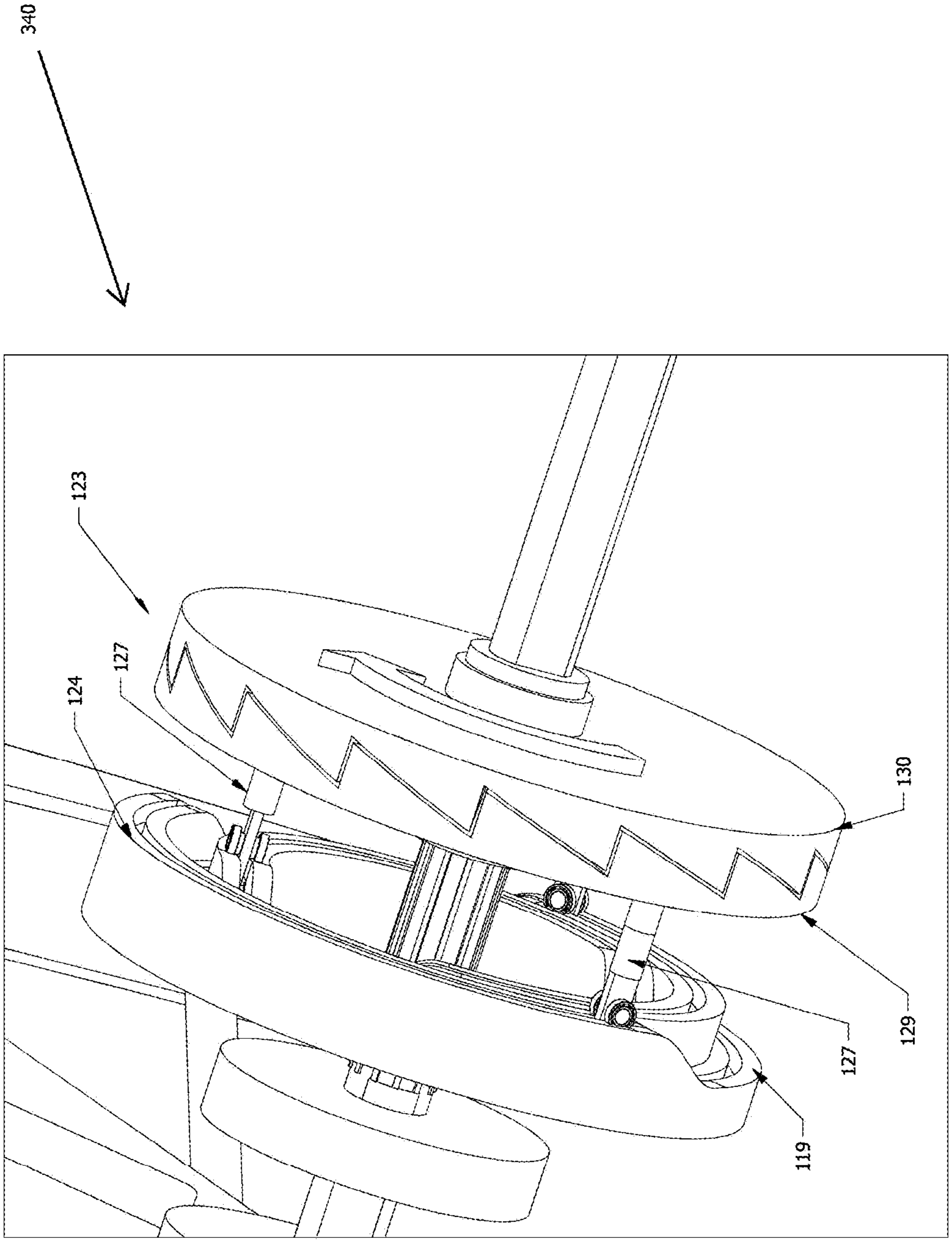
FIG. 10 is an enlarged view of the box 340 of FIG. 9.
Figure 11:
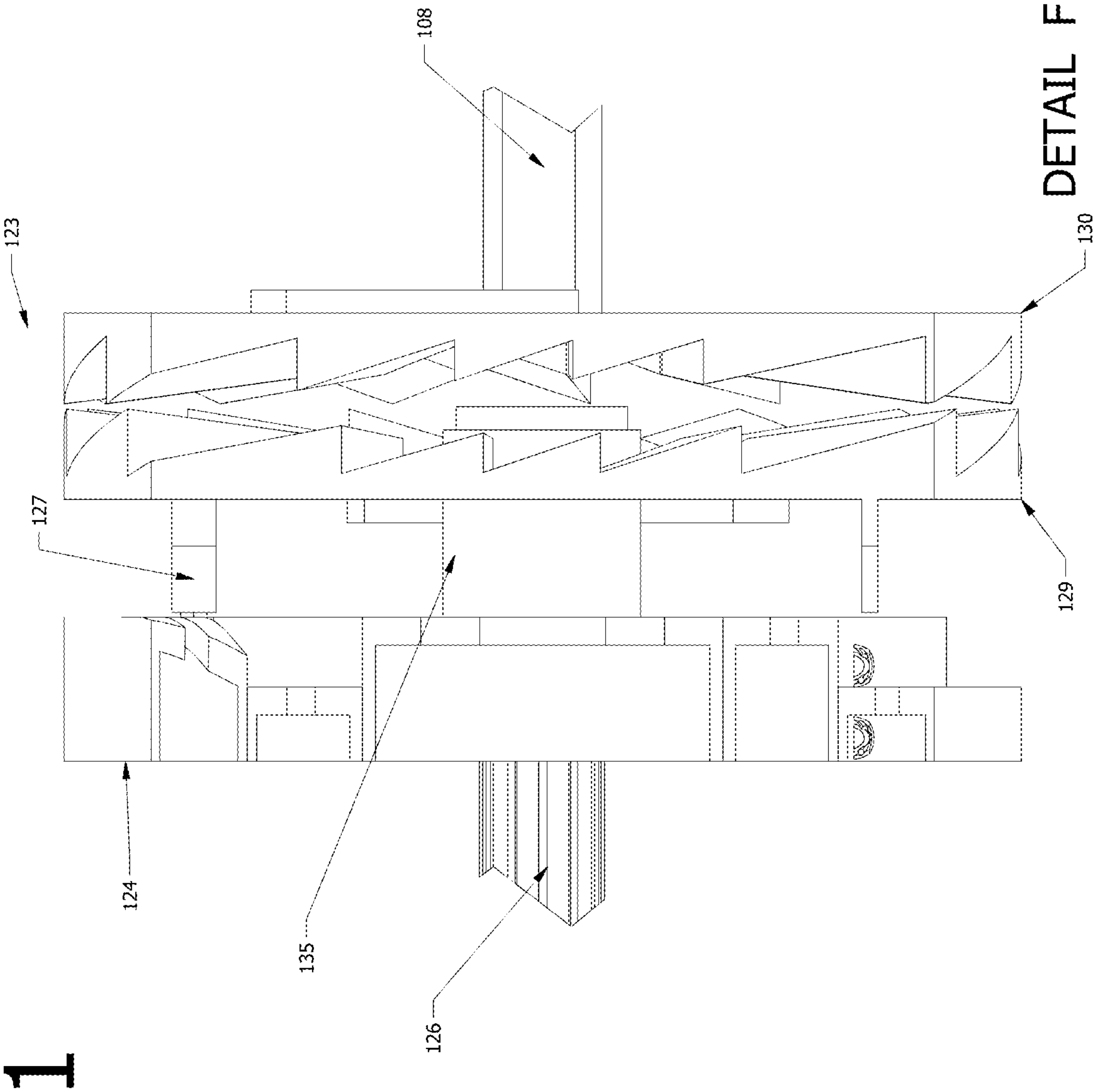
FIG. 11 is an enlarged view of the box F of FIG. 9.
Figure 15:
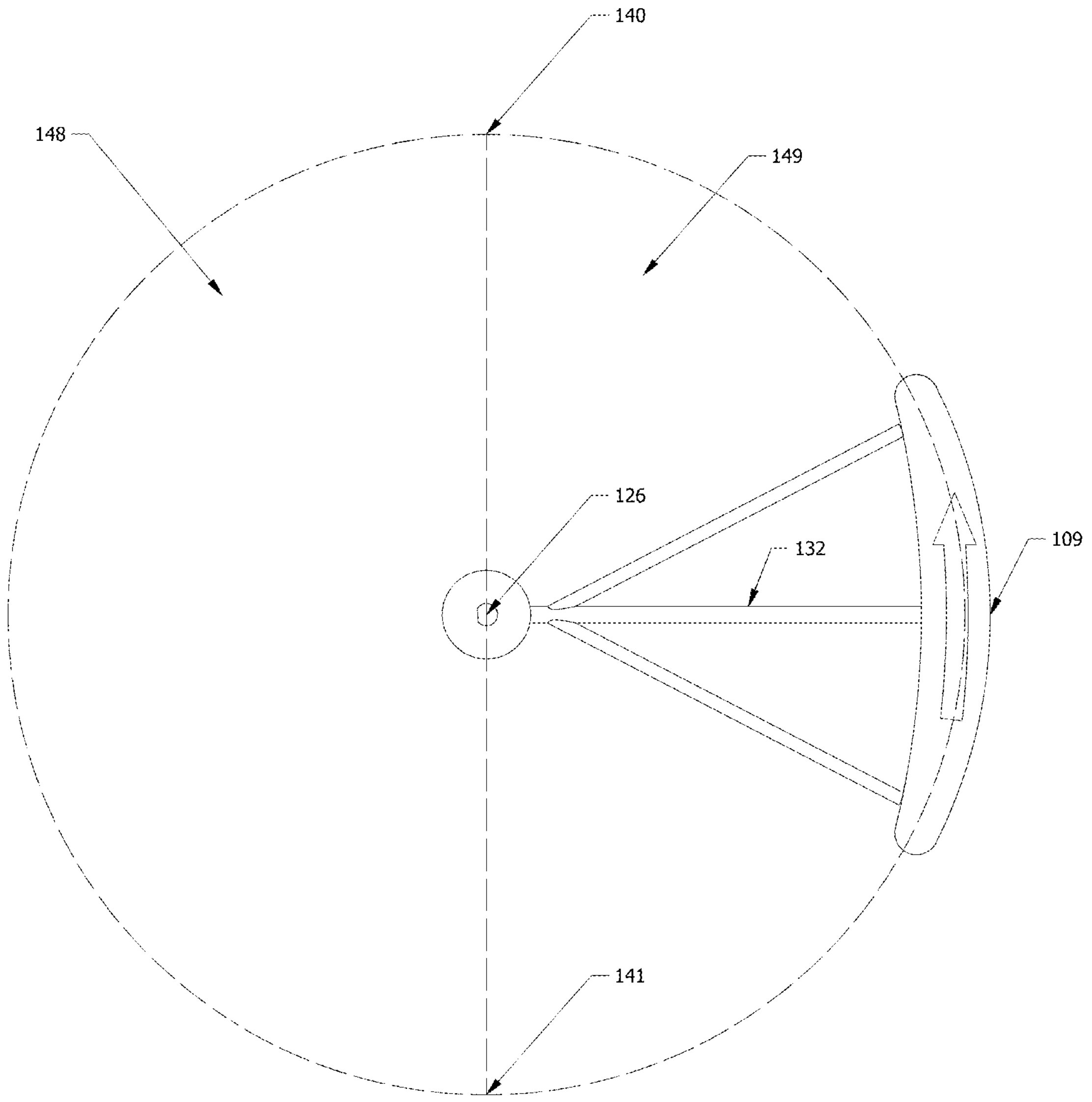
FIG. 15 is an enlarged cross-sectional view taken along the line K-K of FIG. 9, showing a weight moving away from gravity.
Figure 16:
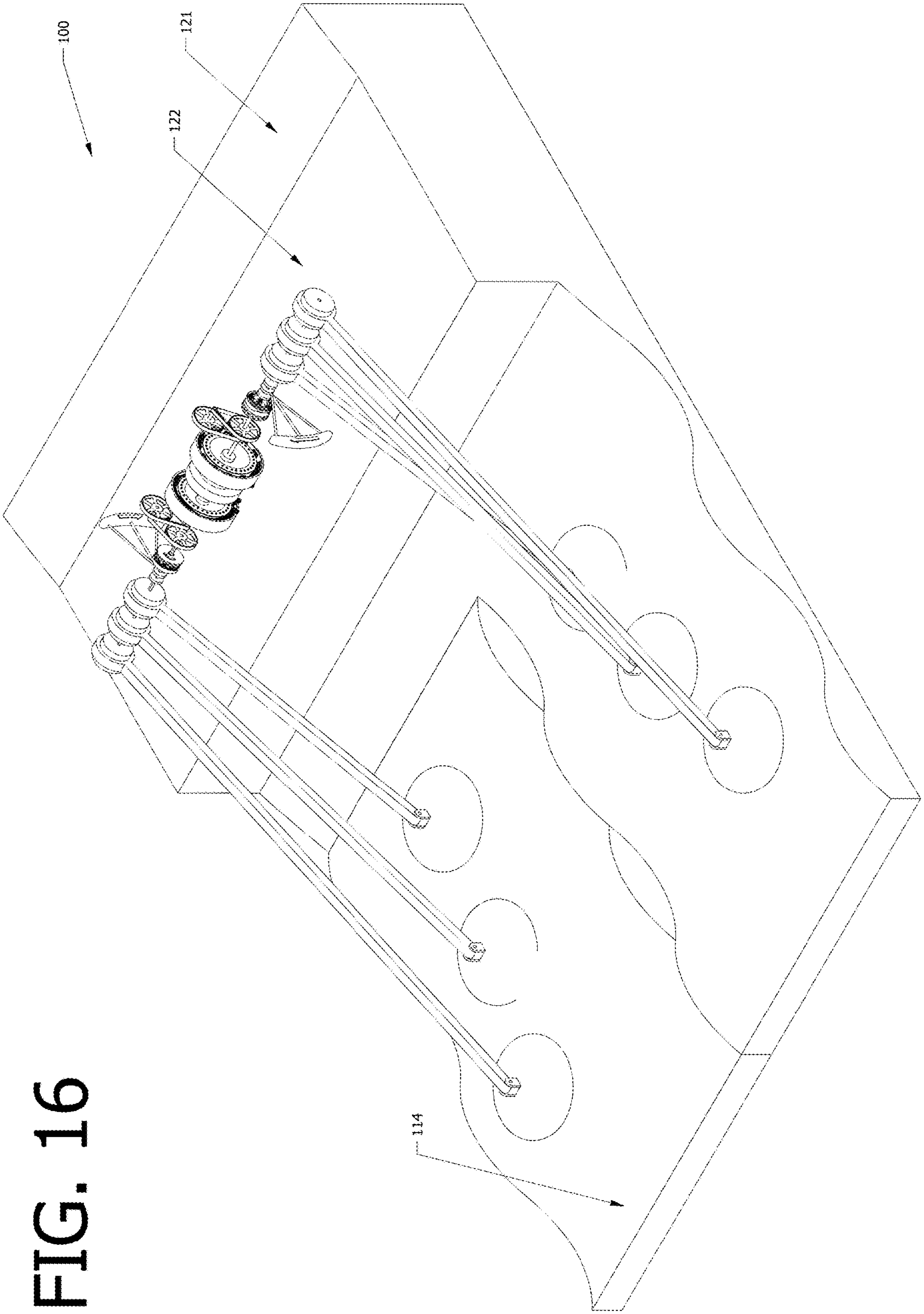
FIG. 16 is a perspective view of a wave hammer generator system positioned proximate a body of water, with multiple input devices in the water, consistent with embodiments of the subject apparatus.

The WHG 100 may include a clutch assembly 123 (FIG. 5). The clutch assembly 123 is configured to disengage shaft 126 from the gear reduction system 115 (FIG. 8) during the lifting phase 149 (FIG. 15). In this arrangement the resistance during the lifting phase 149 can be reduced given shaft 126 can avoid impinging on the gear reduction system 115 (FIG. 8). The opening and closing of clutch assembly 123 as shown in FIGS. 10 and 11 may be controlled by release controller 124 (FIG. 8). Release controller 124 may be connected to clutch assembly 123 via one or more release bearings 127 FIG. 10.

Figure 14:
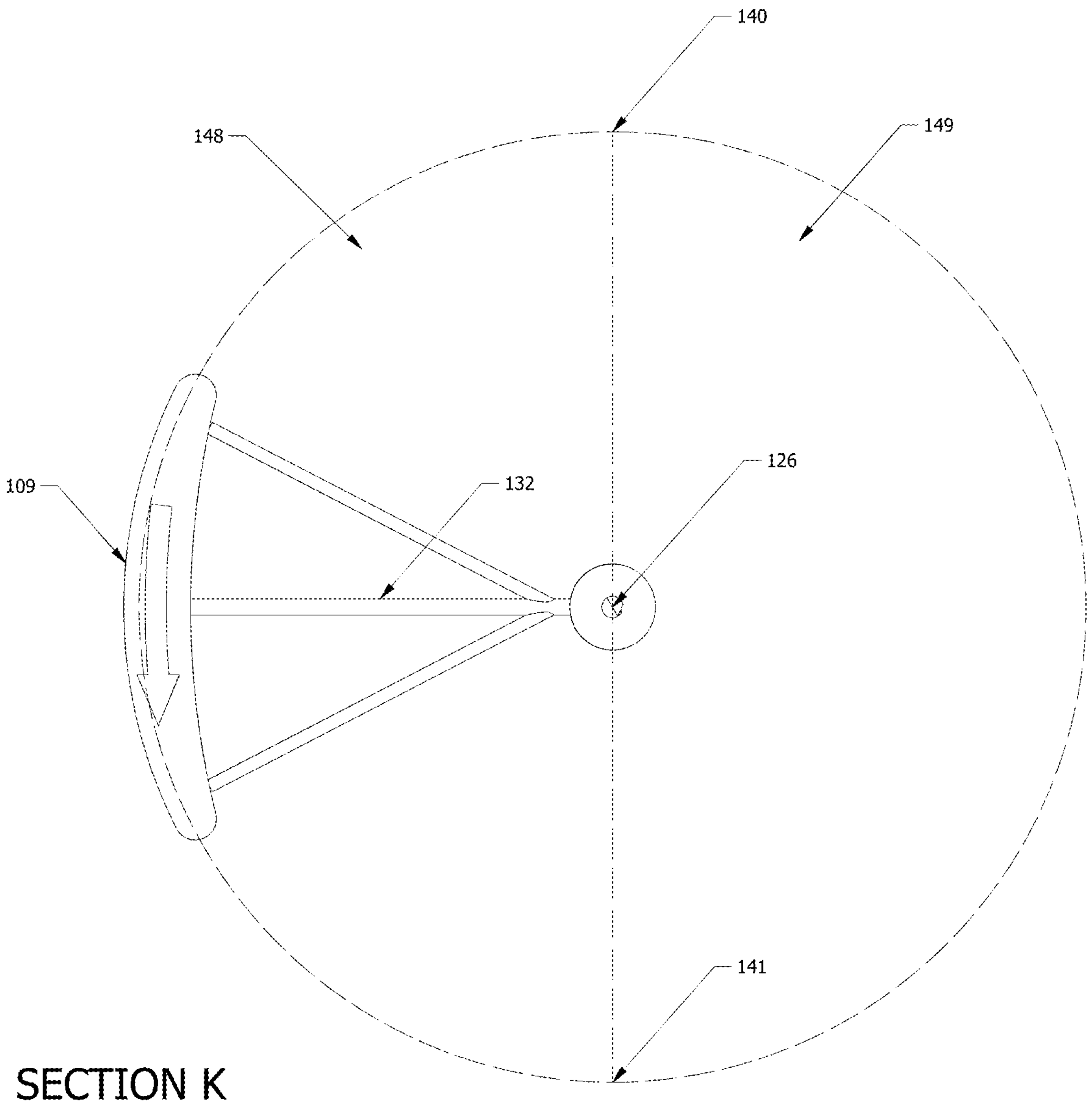
FIG. 14 is an enlarged cross-sectional view taken along the line K-K of FIG. 9, showing a weight moving toward gravity.

Given the effects of rotational momentum, weight 109 may rotate past the low point 141 relative to gravity (FIG. 14). This rotational energy may be preserved given the action of one-way bearing(s) 125 (FIG. 8) which may prevent weight 109 from rotating in the opposite direction.

Additional torque/mechanical advantage to shaft 126 may be realized by increasing the length of truss member 132 (FIGS. 14, 15).

Transfer of Energy Wave Energy

Figure 4:
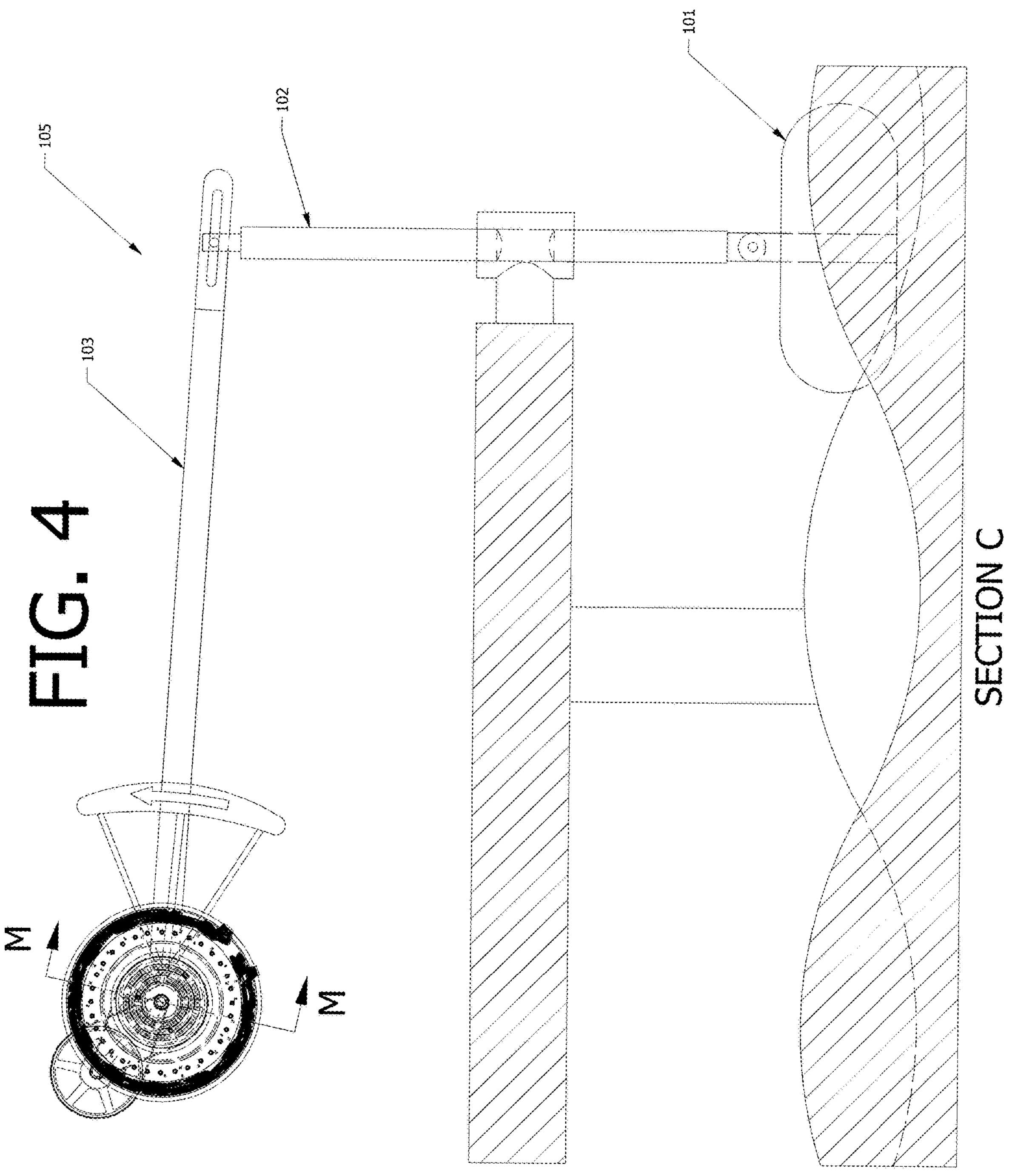
FIG. 4 is an enlarged cross-section view along the line C-C of FIG. 6.

A float(s) 101 (FIG. 4) may rest on the surface of the ocean or any body of water with wave energy. Float 101 may be attached to a vertical arm 102 (FIG. 4). The float 101 may follow the rise and fall of surface of the ocean as waves move up and down. As float 101 rises due to wave action, the float 101 may create a force that causes arm 103 (connected to arm 102) to lift as depicted in FIG. 2. Arm 103 may connect to a one-way bearing 104 (FIG. 7) forming a ratchet system. In part, the ratcheting action of arm 103 and bearing 104 may rotate shaft 126 (FIG. 9) in one direction only. The length of arm 103 may provide a mechanical advantage and a powerful lifting force effecting the action of weight 109.

Clutch Description

Clutch assembly 123 (FIG. 5) may connect and disconnect rotational energy from shaft 126 and shaft 108 at the appropriate time. Clutch assembly 123 may include a clutch plate 129 and a clutch plate 130 (FIG. 5). Clutch plate 130 may be affixed to shaft 108. Clutch plate 129 may be affixed to a linear bearing 135 with splines (FIG. 5). This type of bearing allows clutch plate 129 to slide back and forth along shaft 126 while allowing rotational energy to transfer from shaft 126, to clutch plate 130 and further to shaft 108 (FIG. 9).

Clutch plate 129 may be connected to one or more release bearings 127 (FIG. 5). Release bearings 127 may be connected to a release controller 124 (FIG. 5). Release controller 124 may be bracketed (not depicted) so it can remain stationary. Release bearings 127 may be connected to release controller 124 via bearings 118. The bearings 118 may follow the rails 119 so that clutch plate 129 can engage and disengage. The rails 119 part of the release controller 124 may be situated such that the clutch disengages at the lowest point 141 of gravity (FIGS. 14 and 15), and reengages at the highest point 140 of gravity.

Module 1 and Module 2

The WHG 100 can function with a single module 136 FIG. 3. Multiple modules 136 and 137 can be combined as depicted in FIG. 8.

Staggered Bouys

The WHG 100 can aggregate additional wave energy by adding additional float assemblies to an existing shaft 126 as depicted in FIGS. 16-21. A float assembly may contain a float 101, a ratchet arm 103 and a one way bearing 104. Individual floats 101 and their respective arms 103 may move independent of other floats 101 and arms 103. As may be appreciated, the independent movement captures different waves and different heights of water for a wave breaking near the system. A float assembly 126 may also have a vertical arm 102 (FIG. 3).

In this arrangement a single wave may actuate the rotation of shaft 126 multiple times across more than one module 136/137 (FIG. 8). Given this arrangement the WHG 100 can generate a substantial amount of energy even from a relatively low sea state.

Pier Mounting

Figure 17:
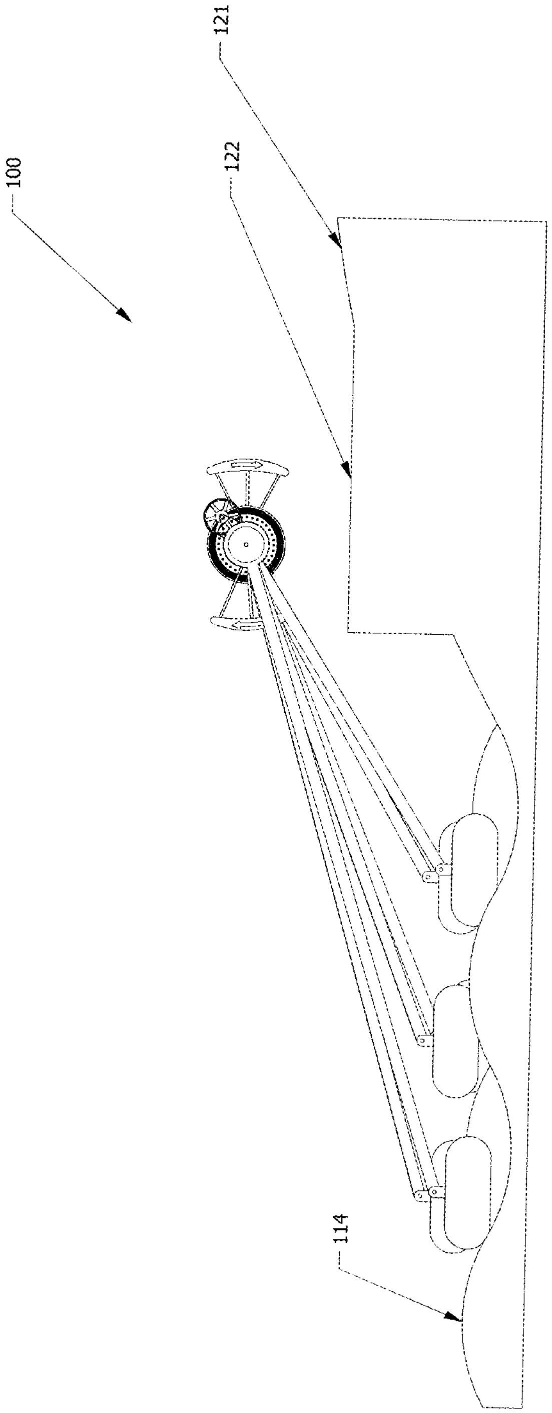
FIG. 17 is a side view of the system of FIG. 16.
Figure 18:
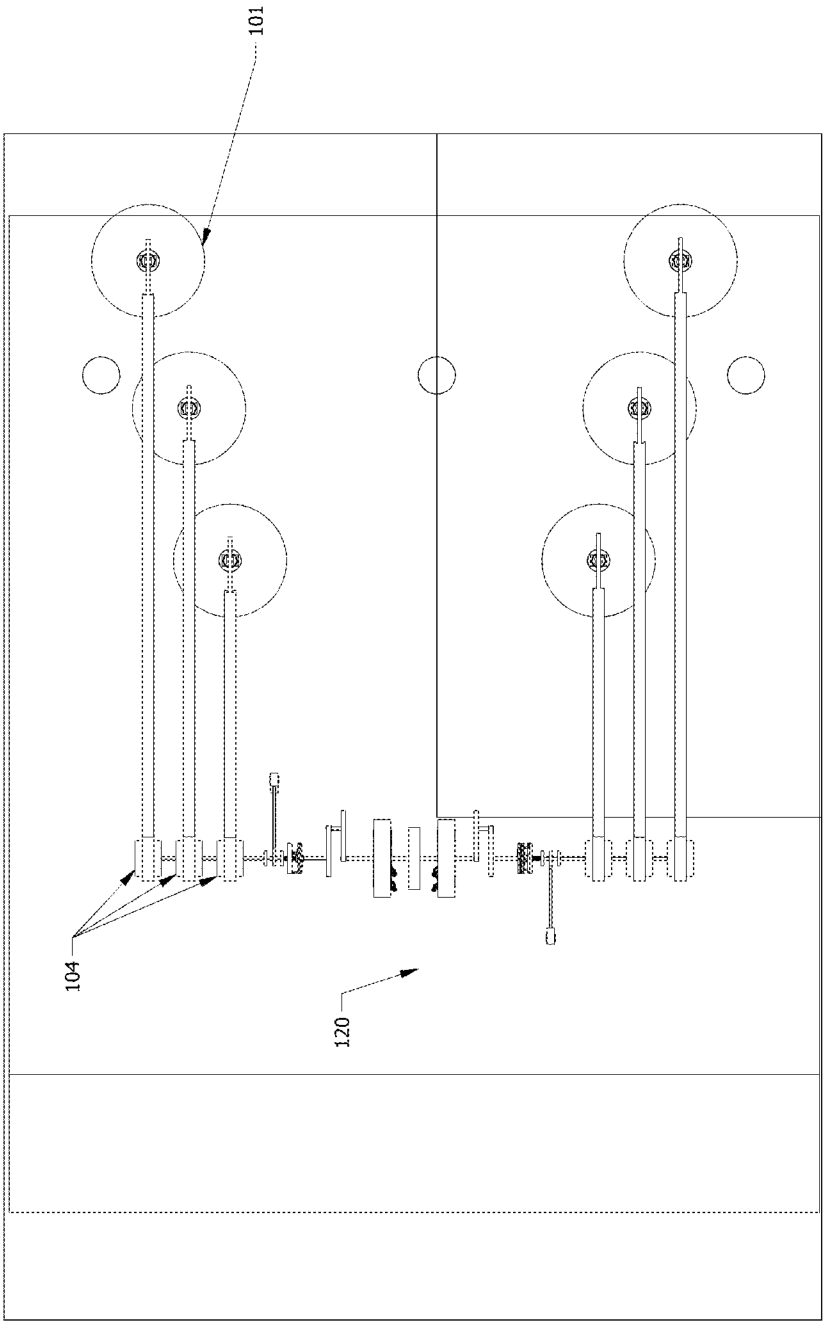
FIG. 18 is a top view of the system of FIG. 16.
Figure 19:
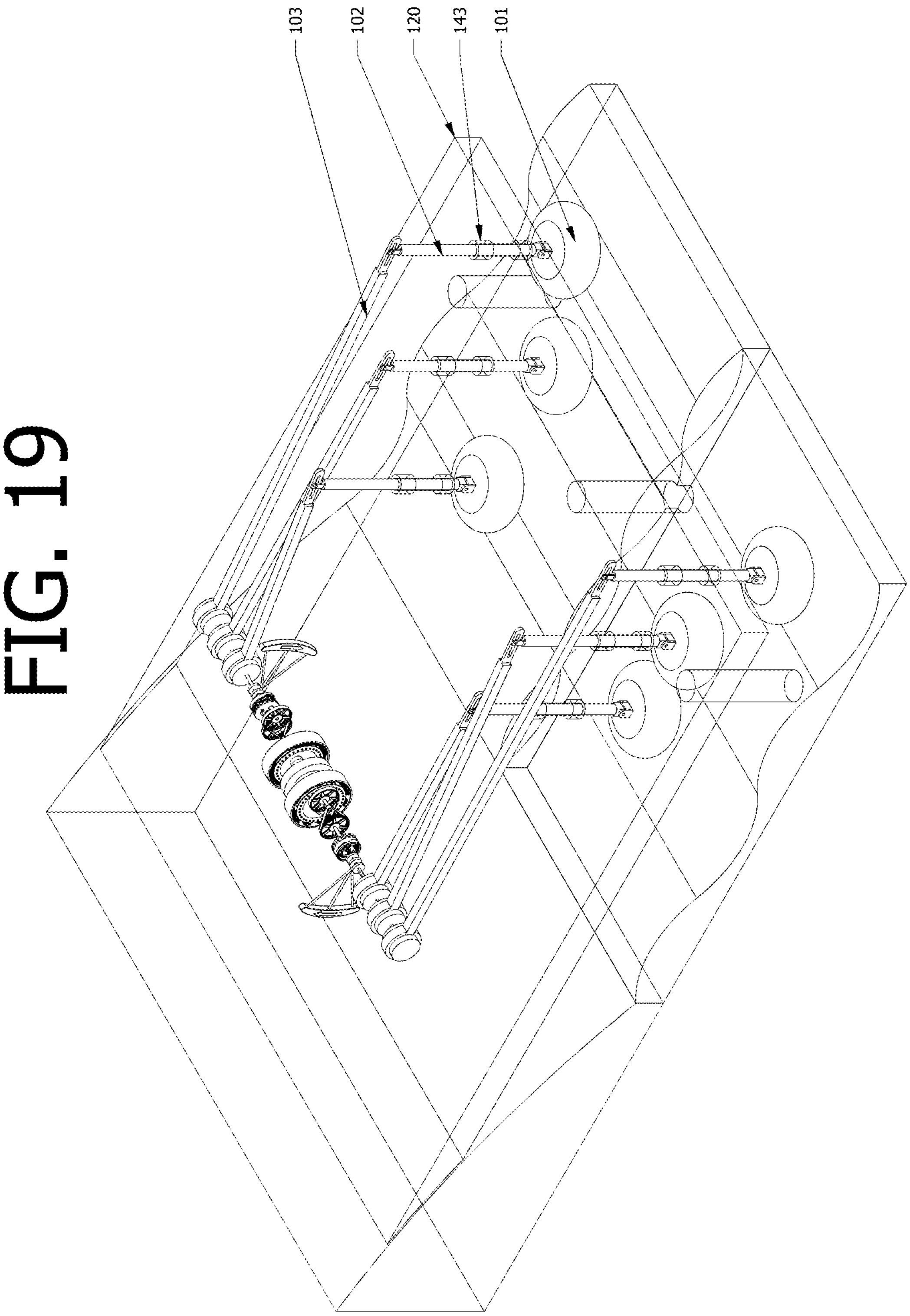
FIG. 19 is a perspective, top view of the system of FIG. 16.
Figure 20:
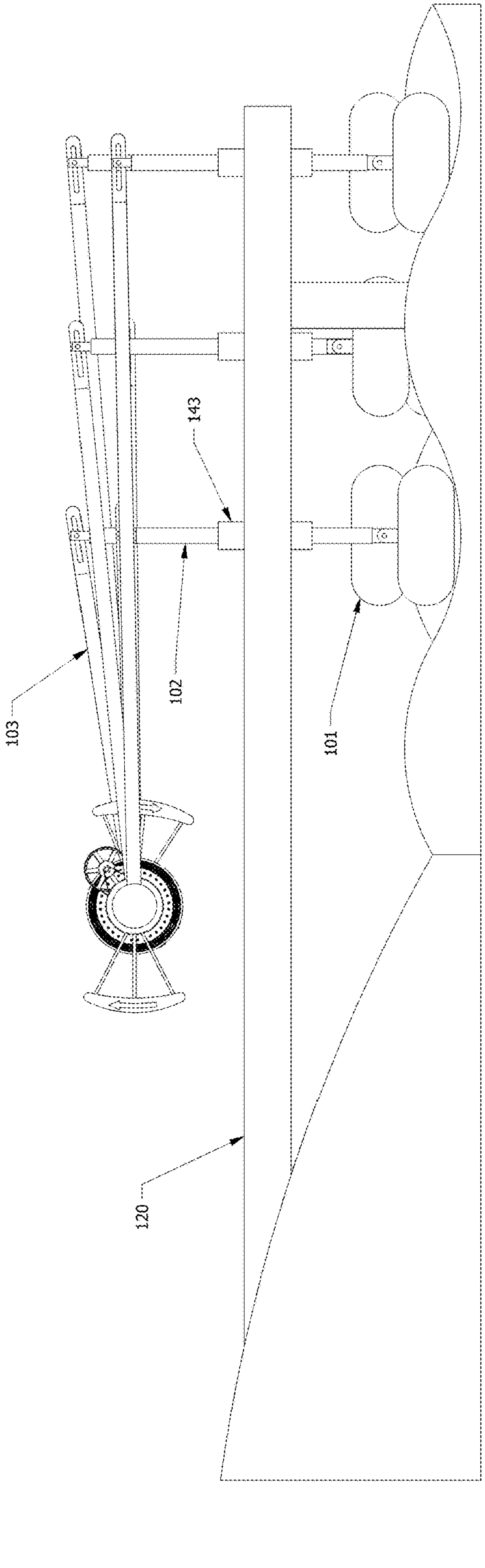
FIG. 20 is an enlarged sideview of the system of FIG. 17 with conduits, consistent with embodiments.
Figure 21:
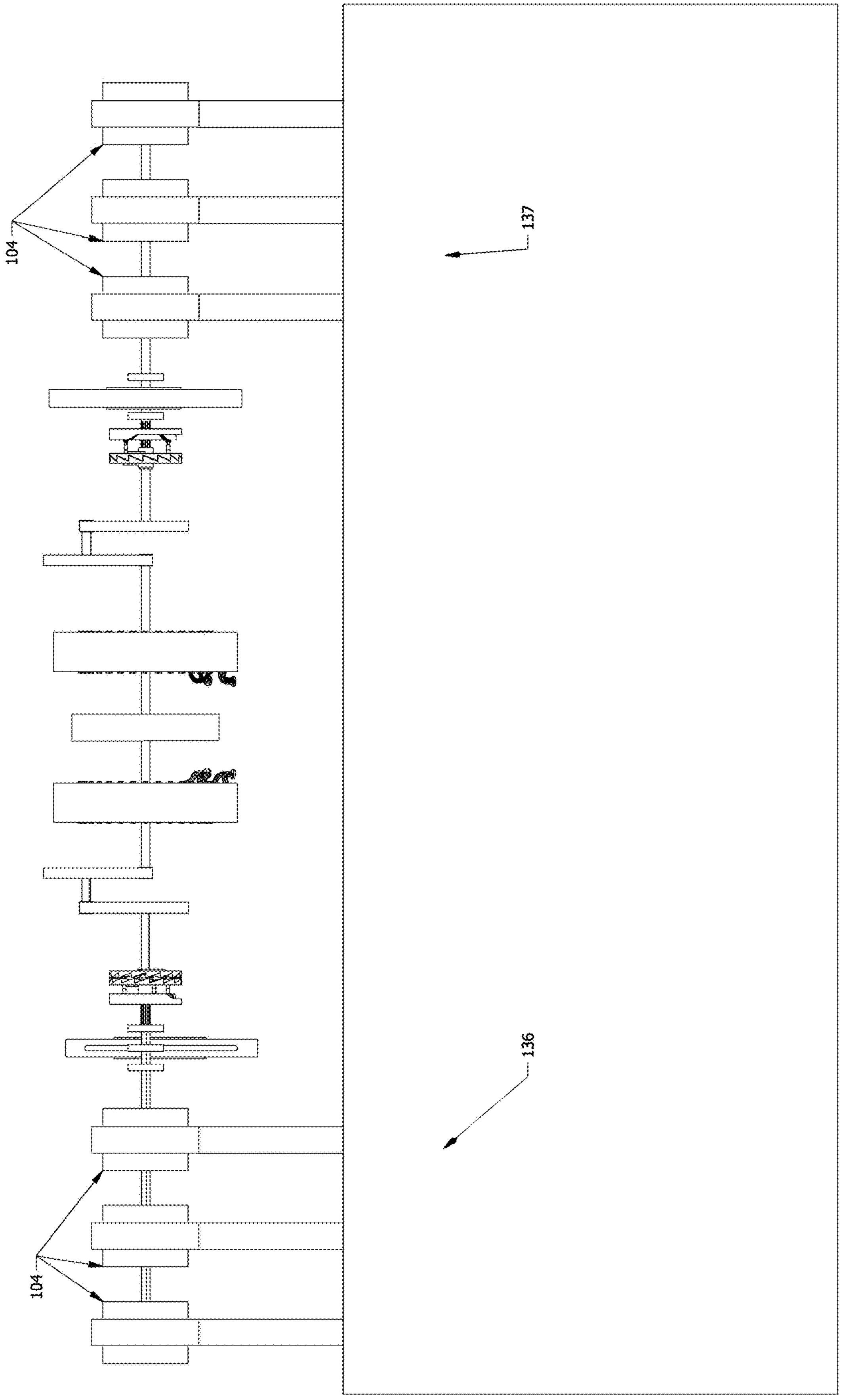
FIG. 21 is a rear view of the system of FIG. 16.

For easy installation and maintenance, the WHG 100 can be mounted on a pier as depicted in FIGS. 17, 18, 19. Vertical arms 102 may be stabilized from lateral movement by conduit(s) 143 FIGS. 19, 20.

Additional Connections

Figure 13:
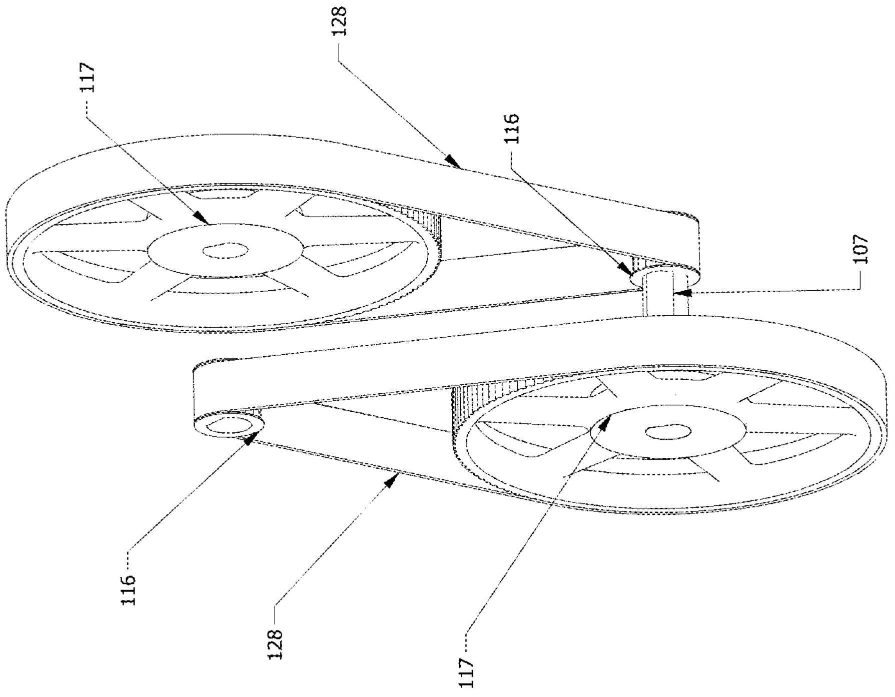
FIG. 13 is a side perspective view of the shaft, gear, and pulley systems shown in FIG. 12.
Figure 12:
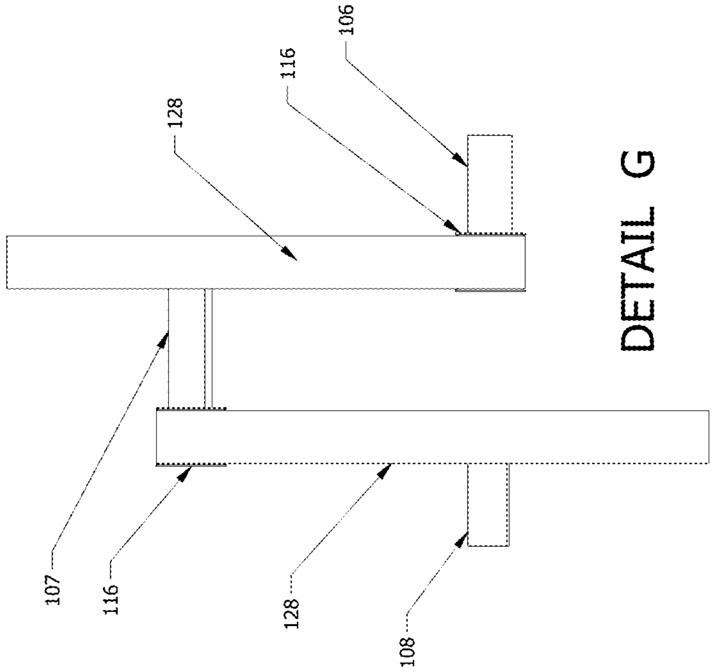
FIG. 12 is an enlarged view of the box G of FIG. 9.

In FIG. 12, a gear reduction assembly 115 includes a shaft 107 connected to large pulley 117 and small pulley 116 which cooperate to provide a gear reduction between the clutch assembly 123 and the output(s) which may include the generator(s) 112 and/or the flywheel 113. In FIG. 8, shaft 108 connects clutch plate (B) 130 in FIG. 5 to gear reduction assembly 115 in FIG. 8. In FIG. 13, gear 116 cooperates with gear 117 to generate a gear reduction. In FIG. 15, platform 122 serves as a mount for the WHG 100. The platform 122 may sometimes be a pier to provide easy access to a water source with wave action. In FIG. 12, belt 128 connects to pulley 116 and pulley 117. In FIG. 5, rotary thrust bearing 135 allows for both the separation and the union of clutch plates 129 and 130 while simultaneously transferring rotational energy from shaft 126.

Those of skill in the art would appreciate that various components and blocks may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A wave hammer generator apparatus, comprising:

a float configured to sit atop or be submerged under, a surface of a body of water, wherein the float moves up and down with a wave action;

an arm coupled to the float, wherein the arm is configured to move as the float moves;

a weight coupled to the arm;

a shaft coupled to the arm and to the weight, wherein the weight moves in a rotational direction in response to a rotation of the shaft;

a one-way bearing coupled to the shaft wherein the one-way bearing prevents the weight from moving in an opposite direction; and an output device coupled to the weight, wherein the movement of the weight up and down generates kinetic energy that is transferred to the output device.

2. The apparatus of claim 1, further comprising an electrical generator coupled to the weight.

3. The apparatus of claim 1, further comprising a flywheel coupled to the weight.

4. The apparatus of claim 1, further comprising a clutch assembly coupled to the weight.

5. The apparatus of claim 1, further comprising:

a shaft coupled to the arm and to the weight, wherein the weight moves in a direction in response to a rotation of the shaft; and a gear reduction assembly coupled to the shaft and configured to amplify the generated kinetic energy to the output device.

6. The apparatus of claim 1, wherein the weight is a pendulum configured to rotate about an axis.

7. A wave hammer generator apparatus, comprising:

a plurality of floats configured to sit atop or be submerged under, a surface of a body of water, wherein the floats move up and down with a wave action;

a plurality of arms coupled to the respective floats, wherein the arms are configured to move independent of each other as the respective floats move;

a shaft coupled to the plurality of arms, wherein the shaft rotates in response to one or more of the arms moving via the movement of the floats;

a pendulum coupled to the shaft, wherein the pendulum is configured to rotate about the shaft in response to the shaft rotating; and an output device coupled to the shaft, wherein the movement of the pendulum up and down generates kinetic energy that is transferred through the shaft to the output device.

8. The apparatus of claim 7, further comprising a one-way bearing coupled to the shaft wherein the one-way bearing is configured to restrict the shaft to rotate in one direction.

9. The apparatus of claim 7, further comprising one or more electrical generators coupled to the shaft and powered by the movement of the weight transferred through the shaft.

10. The apparatus of claim 7, further comprising one or more flywheels coupled to the shaft and configured to conserve energy transferred along the shaft.

11. The apparatus of claim 7, further comprising a gear reduction assembly coupled to the shaft, wherein the gear reduction assembly is configured to convert torque at a first level of revolutions per minute from another shaft coupled to the shaft into a higher level of revolutions per minute realized at the shaft.

12. The apparatus of claim 11, further comprising a clutch assembly coupled to the shaft and to the gear reduction assembly, wherein the clutch assembly is configured to disengage the shaft from the gear reduction assembly.

* * * * *